Feb. 11, 1958 F. N. ROBERTS ET AL 2,823,146
PROCESS OF PRINTING AN ELECTRICAL CIRCUIT ON A CHLORINATED
POLYMER, RESULTANT ARTICLE AND PRINTING INK
Filed March 5, 1954
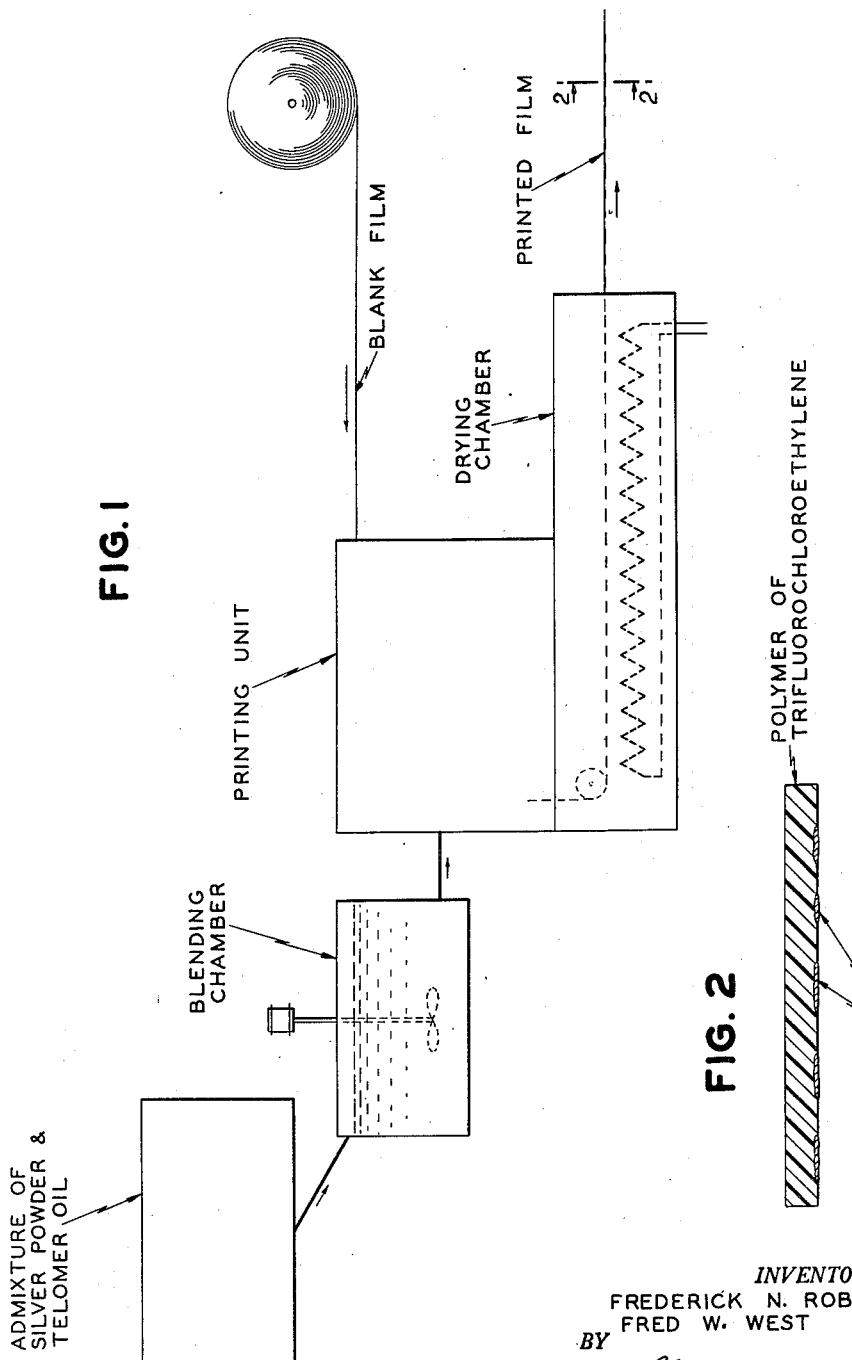
*INVENTORS*
FREDERICK N. ROBERTS
FRED W. WEST
BY
ATTORNEYS

United States Patent Office 2,823,146
Patented Feb. 11, 1958

2,823,146

PROCESS OF PRINTING AN ELECTRICAL CIRCUIT ON A CHLORINATED POLYMER, RESULTANT ARTICLE AND PRINTING INK

Frederick N. Roberts, New York, N. Y., and Fred W. West, Ridgefield, N. J., assignors, by mesne assignments, to Minnesota Mining and Manufacturing Company, St. Paul, Minn., a corporation of Delaware Application March 5, 1954, Serial No. 414,492

19 Claims. (Cl. 117—212)

This invention relates to halogen containing plastics. In one of its aspects, this invention relates to an ink for printing electrical circuits on chlorinated plastics. In another of its aspects, this invention relates to a process for printing electrical circuits on halogenated polymers. In one of its more particular aspects, this invention relates to a conductive ink for printing electrical circuits on plastic polymers of trifluorochloroethylene and to a method of applying these inks.

The unusual chemical and physical characteristics of the fluorine containing thermoplastic polymers has led to their wide spread use in industrial applications. Among the most outstanding of the properties of the fluorine containing thermoplastic polymers, such as polymers of trifluorochloroethylene is chemical inertness. Thus, thermoplastic polymers of trifluorochloroethylene may be exposed to a wide variety of corrosive chemicals with no apparent effect. In addition to their high degree of chemical inertness, these polymers possess high thermal stability, excellent electrical properties, and are readily molded into various useful items.

The good electrical properties of polymers such as polytrifluorochloroethylene combined with other desirable characteristics, had lead to their use in a wide variety of electrical applications. Thus, polymers of trifluorochloroethylene are used as cable insulation, electrical stand-offs, etc. The advent of printed electrical circuits, had made it desirable that some method of applying or printing an electrical circuit on these polymers be developed. While many conductive inks have been developed for printing electrical circuits, none are available which will function when applied to a perhalogenated polymer.

It is an object of this invention to prepare a new conductive ink formulation.

It is another object of this invention, to provide an ink which can be used to permanently affix an electrical circuit on the surface of a chlorinated plastic.

It is another object of this invention to provide an ink which will adhere to polymers of trifluorochloroethylene.

It is still a further object of this invention, to provide a conductive ink which is stable at high temperatures and which will not smudge or set after it has been applied.

A still further object of this invention, is to provide a process for applying a conductive ink to chlorine containing plastics.

Various other objects and advantages of the present invention will become apparent to those skilled in the art, on reading the accompanying description and disclosure.

According to this invention, an electrical circuit is printed on a chlorine containing thermoplastic polymer by means of an ink prepared by admixing a conductor with a liquefiable polymer of trifluorochloroethylene. The printed surface is subsequently heated at an elevated temperature to set the ink. The term "polymer" as used herein, includes both homopolymers and copolymers.

The invention is illustrated in Figures 1 and 2 of the drawings. Figure 1 shows the mixing and blending into a dispersion of the conductor such as silver with the liquefiable polymer of trifluorochloroethylene. The dispersed conductor is then applied to the thermoplastic polymer film by a printing unit. The marked polymer film is then passed to a drying chamber where the ink is set by heating. Figure 2 is a section taken along lines 2—2 of Figure 1 and shows the polymer film with embedded conductor, i. e., silver, particles.

The liquefiable polymers of trifluorochloroethylene, which serve as vehicles in the ink of this invention are prepared by polymerization of the monomer trifluorochloroethylene to produce oils, greases and soft waxes. Preferred vehicles are the oils or normally liquid polymers since most marking processes are based on the use of liquid composition. The greases and soft waxes are particularly suited for use in marking processes which require non-liquid compositions and may be dissolved in solvents where liquid compositions are required. The greases and soft waxes have softening points below 150° C. and preferably below about 100° C. Usually, homopolymers of trifluorochloroethylene are preferred since they are more readily applied to a wider variety of materials. However, copolymers, in the oil, grease and soft wax range, of trifluorochloroethylene copolymerized with halogenated olefins such as vinyl chloride, vinyl fluoride, vinylidene fluoride, dichlorodifluoroethylene, trichloroethylene, etc. may also be used as vehicles and their use is within the scope of this invention.

A preferred liquid homopolymer of trifluorochloroethylene, is that which is generally known as telomer oil. The telomer oil is prepared by directly telomerizing or polymerizing the monomer trifluorochloroethylene with a catalyst, such as benzoyl peroxide, in the presence of sulfuryl chloride as the telogen to produce a substantially saturated telomer oil. The telogen, sulfuryl chloride, provides chlorine terminal groups, tends to control telomerization and terminates free radical reaction so that by varying the amount of telogen used, the telomeric material may be obtained in the desired form, that is as an oil grease or wax which is recovered as the product of the process.

The reaction occurs essentially as shown below:

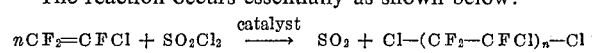

$$nCF_2{=}CFCl + SO_2Cl_2 \xrightarrow{\text{catalyst}} SO_2 + Cl{-}(CF_2{-}CFCl)_n{-}Cl$$

As shown, sulfur dioxide gas is formed as well as a clear polymeric mass, usually in gel-like form, which includes various grades of telomeric halocarbons, such as oils, grease and soft waxes. These telomeric halocarbons may be separated by conventional distillation. The distillable substances obtained by telomerizing chlorotrifluoroethylene compounds in the presence of sulfuryl chloride are sufficiently stable as not to absorb appreciable amounts of fluorine even though exposed to the gas for 24 hours at a temperature of 60° C. or to significantly pyrolytically decompose at temperatures up to 200° C. This process may also be used to prepare copolymers or co-telomers of trifluorochloroethylene with halogenated olefins.

The mol ratio of sulfuryl chloride to monomer employed in these procedures is between about 2:1 and about 1:10, preferably between 1:1 and 1:4 depending upon the products desired and the starting materials used. The optimum mol ratio for producing primarily telomeric chlorotrifluoroethylene oils and greases, is 1:2 of the telogen to monomer. The telomerization may be carried out in the presence of a suitable inert solvent, if desired. The term inert solvent means any liquid which does not materially alter the normal telomerization of haloethylenic compounds in the presence of sulfuryl chloride such as Freon 113 tetrachloroethylene or tetrachloroethane. It should be noted that water slowly reacts with sulfuryl chloride to form hydrochloric acid and sulfuric acid and therefore precautions should be taken to provide substantially anhydrous conditions. Glass lined equipment is usually desirable, however Monel and stainless steel have been used for polymerization and filtration apparatus without noticeable corrosion.

The preferred liquid homopolymers of trifluorochloroethylene, are characterized by the presence in the molecule of an even number of carbon atoms and of chlorine terminal groups. Those liquid homopolymers or telomers, which are suitable to the process of this invention, contain between about 4 and about 15 monomer units in the chain. A typical analysis of the preferred liquid homopolymer shows a chlorine content of 31.1% and a fluorine content of 46.2%. The preparation of the above telomer is described in detail in pending application Serial No. 294,495 of William S. Barnhart, filed June 19, 1953.

There is a difference between the various liquefiable homopolymers of trifluorochloroethylene depending upon the method by which they are prepared. Thus, while either telomer oil or cracked oil i. e. oils prepared by thermal decomposition of high polymer may be used interchangeably as a vehicle for marking nonfluorinated thermoplastics, such as polymers of vinyl chloride, vinylidene chloride, chlorostyrene, etc. noticeable differences in the quality of the mark were observed with respect to the fluorinated thermoplastics. Generally, the more highly fluorinated plastics were less satisfactorily printed with inks which contained cracked oil as a vehicle. For example when homopolymers of trifluorochloroethylene were printed with an ink which contained telomer oil as a vehicle a clear permanent mark was obtained whereas when cracked oil was used a somewhat fugitive mark resulted. The superiority of telomer oil in printing the more highly fluorinated thermoplastics is believed due to its high chlorine content which results in a more rapid and even penetration of the fluorinated surface to which it is applied. Since other theories may be advanced which explain the difference between these polymers, this theory should not be construed as unnecessarily limiting.

In the formulation of the inks which comprises this invention, any electrical conductor may be employed. Thus, a variety of materials varying in their conductive properties, are suitable. Good conductors, such as, silver, aluminum, copper and poor conductors, such as amorphous carbon, graphite, etc. have been found useful. Extremely poor conductors, such as mica and talc are useful for modifying the conductive properties of other conductors. Generally, the poor conductors are used where the portion of the electrical circuit is to function as a resistor. The conductor which is incorporated in the vehicle of this invention, should preferably be in finely divided form. The average particle size of this material should not exceed 50 microns and preferably should be between about 10 and about 0.01 micron. The particle size should be as small as can possibly be obtained since small particle size forms the efficient functioning of the circuit.

The conductor is dispersed in the vehicle using any of the conventional blending techniques which are employed in the ink and paint industry. Thus, the conductor and the vehicle may be blended in a pebble mill, ball mill, or any type colloid mill, or the dispersion may be effected by using a three roll paint mill. The concentrations of the conductor in the vehicle, will depend on the desired electrical characteristics. Thus, if a good conductor, such as silver is to carry a fairly high current at high voltages, a higher concentration of silver is required. When a poor conductor such as graphite is to function as a resistor, then the amount will be determined by the desired resistance—the higher the resistance the lower the quantity of poor conductor. Blends of good and poor conductors are used to secure desired electrical characteristics. For example, blends of graphite and mica are used to obtain high resistances. Generally, concentration of the conductor in the vehicle will be between about 1 and about 75 percent while a preferred concentration is between about 5 and about 50 percent. Ink concentrates may contain up to about 80 percent conductor.

Depending upon the viscosity requirements of the printing process which is employed, the conductive ink may be used with or without thinning agents. If thinners are required then any organic solvent which is inert to the other ingredients of the ink may be employed as a thinner. Illustrative of the various thinners which may be employed are ketones, such as acetone, cyclohexanone, methyl cyclohexanone; esters such as ethyl formate, butyl acetate, benzyl acetate; glycol ethers; and chlorinated hydrocarbons such as methylene dichloride, and ethylene dichloride; hydrocarbons of the benzene series such as benzene, toluene and xylene and aliphatic hydrocarbons. The thinner employed should be of low enough volatility so that it will evaporate from the ink quickly at the temperature at which the ink is applied to the plastic material.

The ink composition, with or without a thinner, is applied to the surface of the plastic by any of the conventional printing or marking processes. The marked plastic is then heated at a temperature between about 100° C. and about 375° C. for a period of time between about one second and about 30 minutes to set the ink. Preferably, the marked plastic is heated at a temperature between about 150° C. and about 200° C. for a period of time between about one and 15 minutes. If the ink contains a thinner the thinner is preferably allowed to evaporate before the heating operation is begun. In a continuous printing process rapid surface heating is usually required and thus air or gas temperatures between about 300° C. and about 375° C. may be necessary to set the ink in a short period of time i. e. between about 1 and about 30 seconds. Any source of heat can be used in the application of these inks such as a hot blast of air or an inert gas, oven heat and infra-red heat.

The ink functions by penetrating the solid polymer mass and depositing in or below the surface of the polymer the incorporated conductor. The vehicle, that is the liquid polymer of trifluorochloroethylene, either volatilizes or diffuses through the polymer, leaving the conductor as a concentrated mass in or below the surface of the polymer.

In order to illustrate the process of this invention, the following examples are presented. The examples are representative of a conductive ink formulation which were prepared by dispersing a conductor in the oil in a three roll paint mill, and were successfully employed in printing electrical circuits on the surface of a normally solid thermoplastic homopolymer of trifluorochloroethylene which had an N. S. T. of about 280. These examples are offered for purposes of illustration and are not to be construed as unnecessarily limiting the invention.

*Example I*

Approximately 60 weight percent of finely divided silver powder was admixed with 40 weight percent of telomer oil. The admixture was thoroughly blended on a three roll paint mill. This ink was applied to a film of a homopolymer of trifluorochloroethylene by the silk screen technique. The printed film was heated for 2 minutes at 190° C. to set the ink. A 1″ length of the silver circuit having a width of about 1/16″, had a resistance of about 1/3 ohm. Voltage breakdown characteristics of the strip were good. The ink circuit was stable, did not smudge or crack and did not offset when the inked surface was reheated.

*Example II*

Approximately 15 weight percent of finely divided graphite (Dixon airspun graphite type 200–10) and 85 weight percent of telomer oil boiling between about 95° C. and about 250° C. at 0.5 mm. was thoroughly blended on a three roll paint mill. This ink was applied to a film of a homopolymer of trifluorochloroethylene by the silk screen technique. The printed film was heated at 190° C. for 15 minutes to set the ink. The resistance of a strip of this ink measuring 1½ x ⅟₁₆ x 0.5 mils was measured with a Senior Voltohmyst. The resistance was 13,500 ohms. The ink circuit was stable, did not smudge or crack and did not offset when reheated.

Various modifications and alterations of the process of this invention will be apparent to those skilled in the art and may be used without departing from the scope of this invention.

Having thus described our invention, we claim:

1. A novel conductive ink composition which comprises a dispersion of a polymer of trifluorochloroethylene having a softening point below 150° C. and a silver conductor consisting essentially of particles having a size below 50 microns, the ratio of polymer to conductor being such that a conductive layer is produced when the ink is set.

2. A novel conductive ink composition which comprises a solution of a polymer of trifluorochloroethylene having a softening point below about 150° C. in a volatile organic solvent and dispersed in said solution, a silver conductor consisting essentially of particles having a size below 50 microns, the ratio of said polymer to said conductor being such that a conductive layer is produced when the ink is set.

3. A novel conductive ink composition which comprises a dispersion of a normally liquid polymer of trifluorochloroethylene and between about 1 and about 75 weight percent of a silver conductor consisting essentially of particles having a size below 10 microns, the ratio of said polymer to said conductor being such that a conductive layer is produced when the ink is set.

4. A novel conductive ink composition which comprises a dispersion of a normally liquid polymer of trifluorochloroethylene and between about 5 and about 50 weight percent of a silver conductor consisting essentially of particles having a size below 10 microns, the ratio of said polymer to said conductor being such that a conductive layer is produced when the ink is set.

5. The product of claim 2 in which the volatile organic solvent is tetrahydrofuran.

6. The product of claim 2 in which the volatile organic solvent is dioxane.

7. The product of claim 2 in which the volatile organic solvent is cyclohexanone.

8. The product of claim 2 in which the volatile organic solvent is ethylene dichloride.

9. A process for printing an electrical circuit on a chlorinated polymer which comprises applying to the surface of the chlorinated polymer an ink which comprises an admixture of a conductor having a particle size below 50 microns and a polymer of trifluorochloroethylene having a softening point below 150° C. and maintaining the printed surface at a temperature between about 100° C. and about 375° C. for a period of time between about 1 second and about 30 minutes.

10. The process of claim 9 wherein the chlorinated polymer is a polymer of trifluorochloroethylene.

11. The process of claim 9 wherein the chlorinated polymer is a polymer of vinyl chloride.

12. The process of claim 9 wherein the chlorinated polymer is a polymer of vinylidene chloride.

13. A process for printing an electrical circuit on a chlorinated polymer which comprises applying to the surface of the chlorinated polymer an ink which comprises an admixture of a conductor having a particle size below 50 microns and a normally liquid homopolymer of trifluorochloroethylene and maintaining the printed surface at a temperature between about 150° C. and about 200° C. for a period of time between about 1 minute and about 15 minutes.

14. A process for printing an electrical circuit on a chlorinated polymer which comprises applying to the surface of the chlorinated polymer an ink which comprises an admixture of a conductor having a particle size below 50 microns and a normally liquid homopolymer of trifluorochloroethylene and maintaining the printed surface at a temperature between about 300° C. and about 375° C. for a period of time between about 1 second and about 30 seconds.

15. A process for printing an electrical circuit on a homopolymer of trifluorochloroethylene surface which comprises applying to the surface a conductive ink which comprises an admixture of finely-divided silver having a particle size below 50 microns and a normally liquid homopolymer of trifluorochloroethylene and maintaining the printed surface at a temperature between about 150° C. and about 200° C., for a period of time between about 1 minute and about 15 minutes.

16. A process for printing an electrical circuit on a homopolymer of trifluorochloroethylene surface which comprises applying to the surface a conductive ink which comprises an admixture of finely divided graphite having a particle size below 50 microns and a normally liquid homopolymer of trifluorochloroethylene and maintaining the printed surface at a temperature between about 150° C. and about 200° C. for a period of time between about 1 minute and about 15 minutes.

17. A solid polymer of a chlorinated olefin surface printed with a conductive ink composition which comprises an admixture of a conductor having a particle size below 50 microns and a polymer of trifluorochloroethylene having a softening point below 150° C.

18. A solid polymer of trifluorochloroethylene surface printed with a conductive ink composition which comprises an admixture of a conductor having a particle size below 50 microns and a polymer of trifluorochloroethylene having a softening point below 150° C.

19. A solid homopolymer of trifluorochloroethylene surface printed with a conductive ink which comprises a normally liquid homopolymer of trifluorochloroethylene and a conductor having a particle size below 50 microns in an amount between about 1 and about 75 weight percent.

References Cited in the file of this patent

UNITED STATES PATENTS

| | | |
|---|---|---|
| 2,468,664 | Hanford | Apr. 26, 1949 |
| 2,510,078 | Compton | June 6, 1950 |
| 2,644,804 | Rubin | July 7, 1953 |